United States Patent
Lo et al.

(10) Patent No.: US 12,287,224 B2
(45) Date of Patent: Apr. 29, 2025

(54) VEHICLE OPERATION ZONE DETECTION

(71) Applicant: NEUTRON HOLDINGS, INC., San Francisco, CA (US)

(72) Inventors: Hung Yui Lo, San Francisco, CA (US); Hao Min, San Francisco, CA (US); Zijie Xu, San Francisco, CA (US)

(73) Assignee: Neutron Holdings, Inc., San Francisco, CA (US)

( * ) Notice: Subject to any disclaimer, the term of this patent is extended or adjusted under 35 U.S.C. 154(b) by 14 days.

(21) Appl. No.: 17/183,338

(22) Filed: Feb. 23, 2021

(65) Prior Publication Data

US 2021/0270632 A1  Sep. 2, 2021

Related U.S. Application Data

(60) Provisional application No. 62/980,818, filed on Feb. 24, 2020.

(51) Int. Cl.
*G01C 21/36* (2006.01)
*G01C 21/00* (2006.01)

(52) U.S. Cl.
CPC ..... *G01C 21/3804* (2020.08); *G01C 21/3874* (2020.08); *G01C 21/3885* (2020.08)

(58) Field of Classification Search
CPC ............ G01C 21/3804; G01C 21/3874; G01C 21/3885
See application file for complete search history.

(56) References Cited

U.S. PATENT DOCUMENTS

| | | | | |
|---|---|---|---|---|
| 9,358,986 | B2* | 6/2016 | Hunt | F02D 41/2487 |
| 9,719,801 | B1* | 8/2017 | Ferguson | G01C 21/3602 |
| 9,744,905 | B1* | 8/2017 | Assam | G08G 1/096783 |
| 10,901,422 | B2* | 1/2021 | Bae | G05D 1/0274 |
| 2003/0227395 | A1* | 12/2003 | Zeineh | G08G 5/0013 340/988 |
| 2016/0374045 | A1* | 12/2016 | Pandharipande | G01S 5/18 |
| 2018/0101998 | A1* | 4/2018 | Pierce | G06F 16/24565 |
| 2018/0132163 | A1* | 5/2018 | Silver | H04W 4/50 |
| 2018/0307251 | A1* | 10/2018 | Harvey | G08G 1/22 |
| 2019/0156683 | A1* | 5/2019 | Kuhara | G08G 5/0034 |
| 2019/0248439 | A1* | 8/2019 | Wang | B62K 11/10 |
| 2019/0377342 | A1* | 12/2019 | Panzica | G08G 1/20 |
| 2019/0383627 | A1 | 12/2019 | Nangeroni et al. | |
| 2020/0233415 | A1* | 7/2020 | Panzica | G01C 21/3461 |

(Continued)

FOREIGN PATENT DOCUMENTS

EP 2178062 4/2010

*Primary Examiner* — Shelley Chen
(74) *Attorney, Agent, or Firm* — Dentons US LLP (57) ABSTRACT

This disclosure relates to a vehicle apparatus, and related vehicle control method, the vehicle apparatus including a memory to store zone map data representing one or more operation zones, a sensor of the vehicle fetching vehicle location data from one or more location beacons; and a controller, in communication with the sensor, analyzing the vehicle location data and comparing the present location against locations in the stored zone map data stored in the memory, wherein when the controller determines that the vehicle is entering one of the one or more operation zones, the controller adjusts an operating parameter of the vehicle based upon one or more operation rules associated with the operation zone that the vehicle is entering.

20 Claims, 3 Drawing Sheets

(56) References Cited

U.S. PATENT DOCUMENTS

2020/0378781 A1* 12/2020 Kantarjiev .......... G01C 21/3691
2021/0278241 A1*  9/2021 Igarashi ............. G01C 21/3815
2021/0311475 A1* 10/2021 Gariepy ............... G05D 1/0274

* cited by examiner

VEHICLE OPERATION ZONE DETECTION

CROSS-REFERENCE TO RELATED APPLICATIONS

This application claims priority to and the benefit of U.S. Provisional Application No. 62/980,818, filed Feb. 24, 2020, the disclosure of which is hereby incorporated by reference herein in its entirety.

BACKGROUND

Personal mobility vehicles (PMVs) can be classified as a form of transportation that gives rapid mobility to users over short-to-medium distances, for example, between 0.5 miles and 3 miles. PMVs are often electrified vehicles that are intended for a single rider, such as electric scooters, electric skateboards, and electric bikes. A PMV may be of particular advantage in urban environments where they permit rapid movement between mass transportation hubs and residences, work locations, recreational areas, or commerce areas.

PMV operation in areas of high population density can create negative interactions, such as accidents, injuries, and congestion, between PMV users and other groups, such as vehicle drivers or pedestrians. In some areas or zones, for safety reasons, PMV usage may be limited, restricted in speed, or prohibited in operation through local ordinances or other measures to prevent such negative interactions. For PMV to operate in compliance to the locally defined and regulated operation zones, accurate and timely detection of the PMV entering or exiting the many different zones is very important.

Thus, it may be advantageous to integrate systems into PMVs to improve the operation zone detection during operation.

SUMMARY

Provided herein are systems and methods that can improve detection of when personal mobility vehicles (PMVs) entered or exited operation zones.

The systems and methods of the present disclosure may be of particular advantage in areas with high PMV usage, particularly to aid PMV operating companies and local governments in enforcing local traffic safety regulations associated various operation zones. The systems and methods of the present disclosure can help to reduce the risk or incidence of PMV/vehicle, PMV/pedestrian, PMV/PMV, or solo PMV riding accidents.

DETAILED DESCRIPTION

The present disclosure provides systems and methods of improved detection of personal mobility vehicles (PMV) entering or exiting operation zones. In some instances, it may be advantageous to limit the maximum operational speed of PMVs in areas of high pedestrian density/traffic to minimize the likelihood of pedestrian-vehicle accidents or encounters, or in areas of bad road condition. In other instances, local regulations may prohibit the operation of PMVs in some areas. In other instances, such restrictions or prohibitions may be temporary or imposed according to some schedule.

PMVs may be considered a particular class of vehicular transport for short to medium distances. In many instances, they are electrically powered, wheeled transportation devices with a range from several city blocks to a few miles. PMVs are often arranged in shared networks whereby a user can locate a PMV via a mobile app and use it to move from their present location to a nearby second location (or in some cases, to sequential multiple locations). The PMV can then be left for a subsequent user at the second location. PMV networks are increasingly common in urban areas where PMV use can coincide with heavy local traffic and traffic congestions. In many cases, it may be advantageous to restrict PMV maximum speed in some areas for safety reasons.

Figure 1:
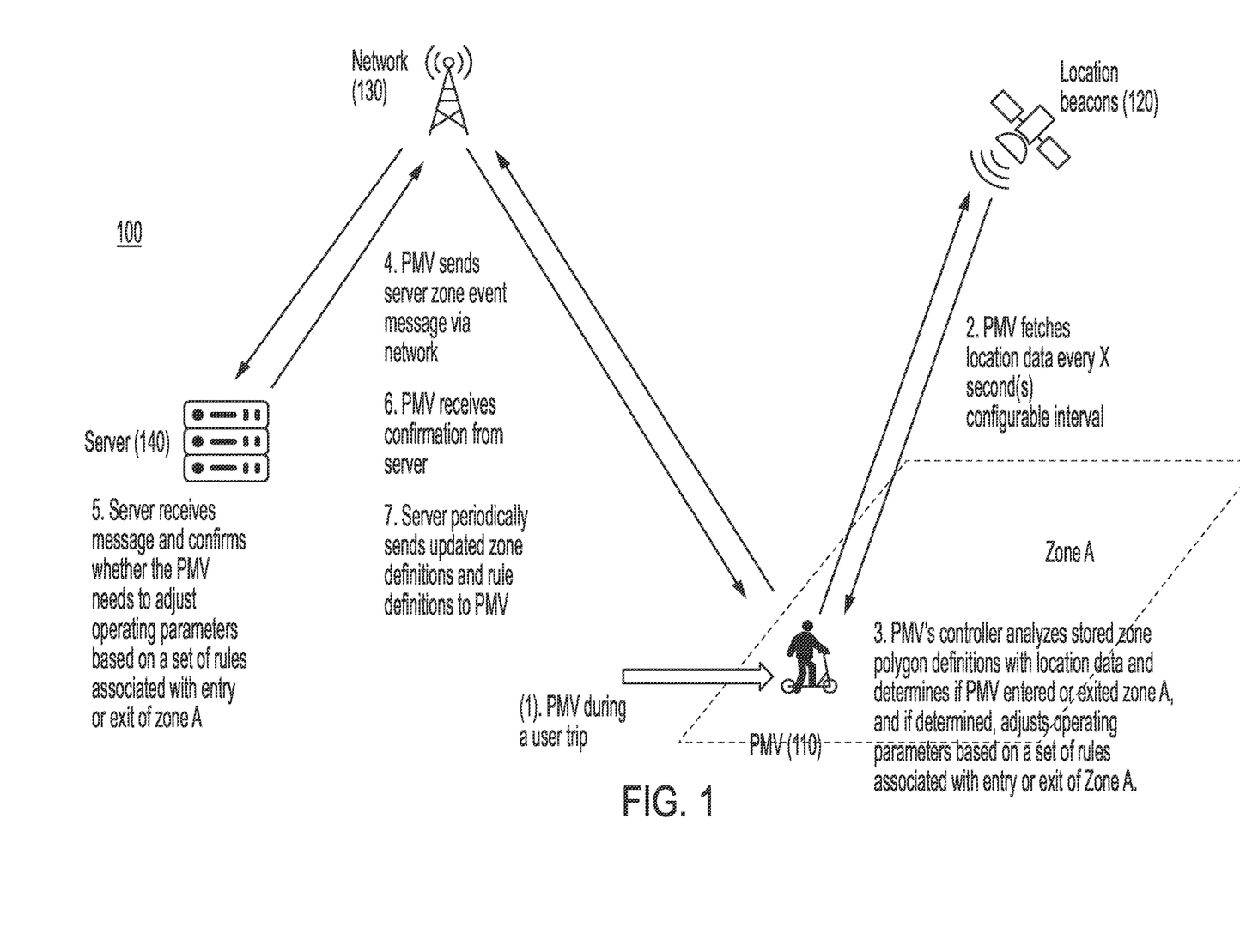
FIG. 1 illustrates an exemplary system with improved detection of PMV entering or exiting an operation zone.

FIG. 1 illustrates an exemplary system (100) with improved detection of PMV entering or exiting an operation zone, as might be found in a typical urban environment. According to some embodiments of the present disclosure, a user may be using a PMV (110), here illustrated as a scooter for example, to travel during a trip. The PMV (110) may include a sensor that fetches the location data of the PMV from various location beacons (120), periodically for example at every X seconds. This X seconds may be referred to as a periodic interval. Such a period interval may be predetermined or dynamic based on the system configuration. The sensor may also passively receive the location data of the PMV, depending on the configuration and the types of various location beacons (120). Such passive reception may also occur periodically for example at every X seconds. The interval of X seconds may be configurable according to control. PMV (110)'s controller may analyze stored zone map data in a memory, such as zone definitions defined by sets of polygon coordinates, with the location data and determine if PMV (110) has entered or exited any particular operation zones, such as Zone A shown. In some embodiments, this analysis may include comparing the stored zone map data to the present location. If the controller of the PMV (110) determines that the PMV (110) has entered or exited a particular zone, then the controller may adjust operating parameters of the PMV (110) based upon a set of operation rules associated with the entry or exit of the particular zone, such as Zone A. If no zone entry or exit was determined, then sensor of the PMV (110) continues to fetch location data, and the controller continues to determine if zone entry or exit has occurred.

In some embodiments, if the controller of the PMV (110) determines that the PMV (110) has entered or exited a particular zone, the communication circuit of the PMV (110) may send a zone event message, which may include information about which operation zone the PMV (110) has entered or exited, to a Server (140) via a Network (130). The Server (140) may determine, based upon the zone event message, a set of operation rules associated with entry or exit of Zone A. The Server (140) may then send a confirmation, including the set of operation rules associated with entry or exit of Zone A, to the PMV (110). Then, the PMV (110) may receive the set of operation rules and may adjust operating parameters of the PMV (110) based upon the received set of operation rules. If the Server (140) determines that the zone entry or exit detection from the PMV (110) is done in error, due to outdated zone data in the PMV (110), or due to detected error of location data in the PMV (110) as correlated by the Server (140), then the Server (140) may send an override message to the PMV (110) to correct the PMV (110)'s data as needed. In one embodiment, the server (140) ma make its determination by comparing the polygon coordinates for the determined operation zone within the stored zone map data to the polygon coordinates for the determined operation zone stored on the server In some embodiments, the zone map data and the operation rules are stored in the memory of the PMV (110), and the controller of the PMV (110) determines if the PMV (110) entered or exited Zone A, and if yes, then determines which set of operation rules is associated with the Zone A entry or exit event. Then the controller may adjust operating parameters of the PMV (110) based upon the set of operation rules associated with the entry or exit of Zone A. In such a case, the Server (140) may still confirm whether zone entry or exit detection from the PMV (110) is valid, based upon zone event detection message. If the Server (140) determines that the zone entry or exit detection from the PMV (110) is done in error, due to outdated zone data in the PMV (110), or due to detected error of location data in the PMV (110) as correlated by the Server (140), then the Server (140) may send an override message to the PMV (110) to correct the PMV (110)'s data as needed.

In some embodiments, the Server (140) may periodically send updated zone map data or operation rules to PMV (110) to be stored in the memory of the PMV (110). Different PMV's (110) may have different sets of zone map data and operation rules, based on their respective different geographic hub locations of their operation, so to avoid having to store too much zone data or operation rules on each PMV. For example, a typical PMV may be generally configured to operate in proximity to a limited number of urban centers close to each other, thus, there is no reason for a PMV to store zone data or operation rules for areas outside of this general designated area.

In some embodiments, the location beacons (120) may include a plurality of GPS (global positioning satellites) broadcasting GPS type signals. The location beacons may also include close range location beacons such as wifi stations, cell towers, blue-tooth beacons, RFID transponders, laser beacons, etc.

In some embodiments, the zone map data may include a set of polygon vertices' location coordinates on a map. Alternatively, because the operation zones are generally defined along specific segments of roads, the zone map data may include a set of coordinates for roads or lanes.

In some embodiments, the operating parameters of the PMV (110) to be adjusted may include maximum speed of the PMV (110). If the PMV (110) is not allowed to operate in a particular zone, the maximum speed may be set to 0, to prevent the vehicle from traveling while powered. However, some zones may allow the PMV (110) to be manually pushed through. Other zones may require that the PMV (110) lock itself to prevent any movement in the zones. Some zones may require the PMV (110) to emit warning lights or sounds to the user and others nearby, for some duration, when entering or passing through the zone. Some zones may not allow the user to stop or park the PMV (110) in the zones, so the PMV (110) may continuously alert the user to not stop nor park in the zones.

Figure 2:
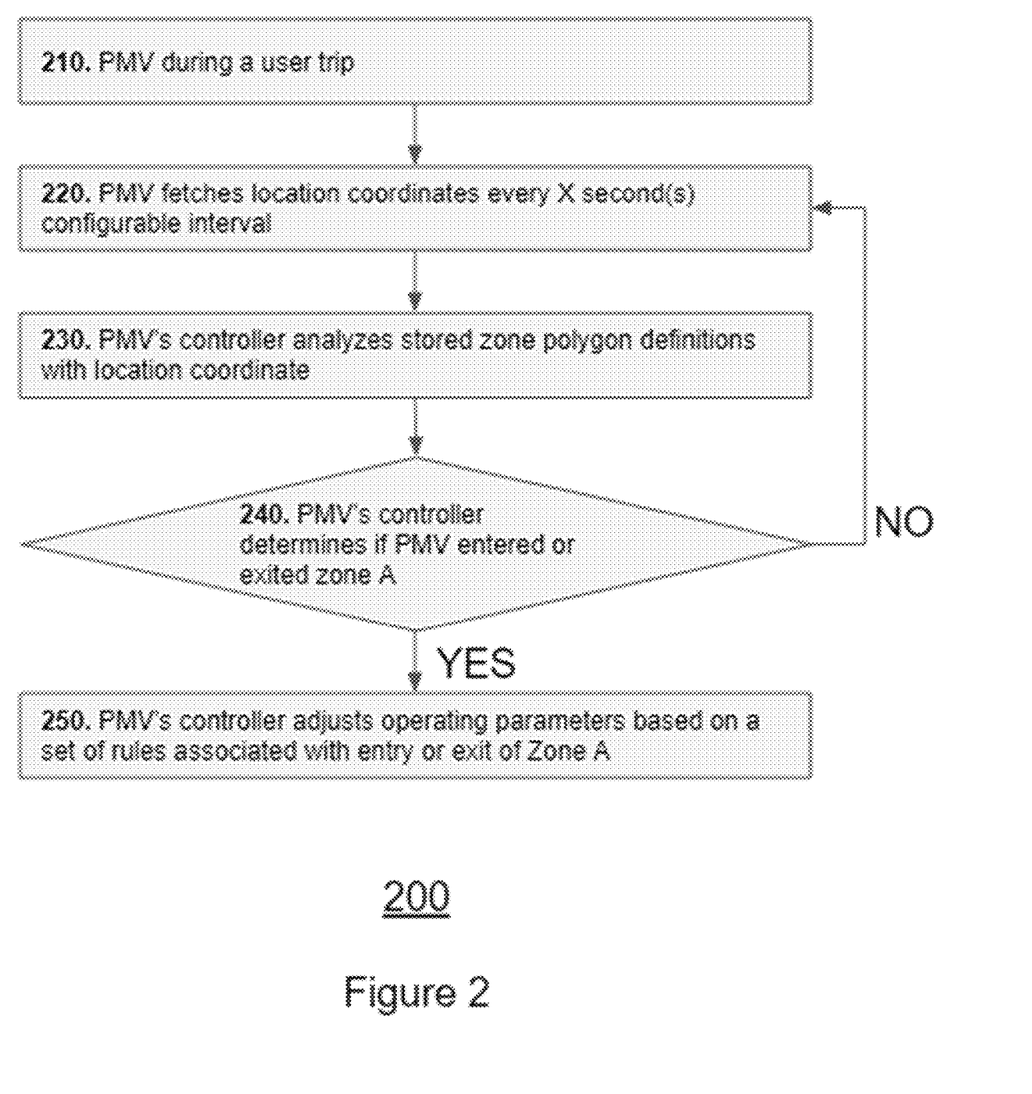
FIG. 2 illustrates a flowchart diagram representation of a method for improved detection of PMV entering or exiting an operation zone.

FIG. 2 illustrates a flowchart diagram (200) representation of a method for improved detection of PMV entering or exiting an operation zone.

At block (210), a user may be using a PMV (110) to travel during a trip.

At block (220), the PMV (110) may include a sensor that fetches the location data of the PMV from various location beacons (120), periodically for example at every X seconds. The interval of X seconds may be configurable according to control.

At block (230), PMV (110)'s controller may analyze stored zone map data in a memory, such as zone definitions defined by sets of polygon coordinates, with the location data.

At block (240), the controller may determine if PMV (110) has entered or exited any particular operation zones, such as Zone A.

At block (250), if the controller of the PMV (110) determines that the PMV (110) has entered or exited a particular zone, then the controller may adjust operating parameters of the PMV (110) based upon a set of operation rules associated with the entry or exit of the particular zone, such as Zone A. Embodiments of operating parameters include changing speed, adjusting lighting, such as headlights, adjusting noise output, such as horns, giving warning indications to the user, or disabling the device due to being outside an operating zone.

If no zone entry or exit was determined, then sensor of the PMV (110) continues to fetch location data at block (220), and the controller continues to determine if zone entry or exit has occurred at block (230).

Figure 3:
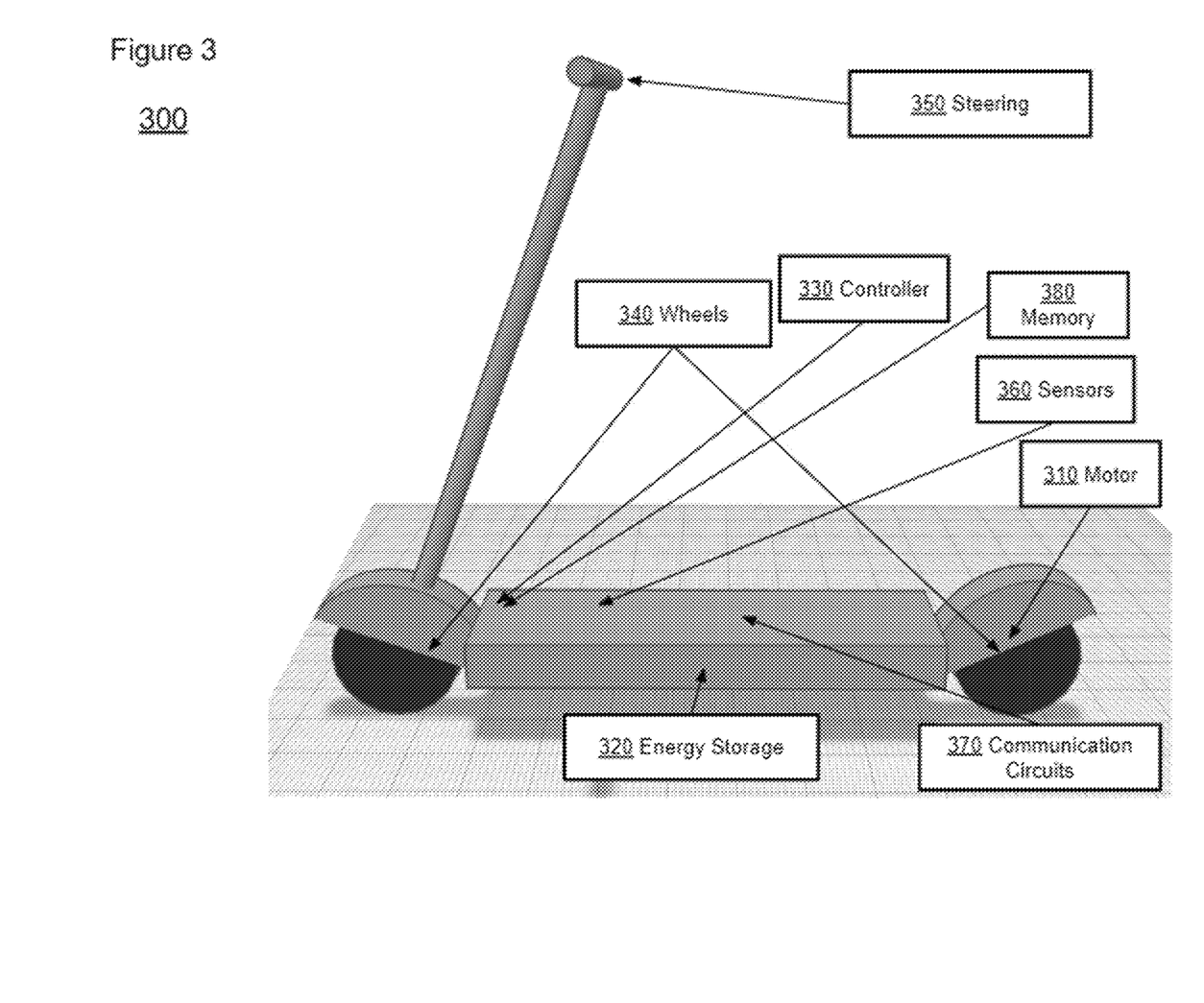
FIG. 3 illustrates an exemplary PMV with exemplary components detailed.

FIG. 3 illustrates an exemplary PMV embodiment (300) as described by the present disclosure. The PMV (300) may include a motor (310) that draws energy from an energy storage (320) to power movement of several wheels (340) of the PMV (300), and a steering (350) to allow directional control of the PMV (300). The PMV (300) may further include sensors (360) connected to a controller (330), and a memory (380) that stores various zone map data, zone operation rules, etc. The PMV (300) may include communication circuits (370) for communicating with networks and servers wirelessly.

In some instances, a PMV (300) may be coupled with a mobile device such as a mobile phone or tablet computer. The mobile device may be equipped with one or more sensors that are capable of collecting data, such as accelerometers, gyroscopes, microphones, cameras, and compasses. The mobile device may also be capable of wireless data transmission.

A gyroscope may also be disposed on the PMV (300). In these instances, the motion vector in the sensor data may be an angular velocity vector, and the magnitude of the motion vector may correspond to a magnitude of the angular velocity vector. The angular velocity vector may comprise a plurality of angular velocity components measured along different axes of the gyroscope.

A PMV (300) may include a compass or direction-determining sensor such as a 2-axis or 3-axis magnetometer. A magnetometer is a type of sensor that can be used to measure a direction and/or strength of a magnetic field in the vicinity of the sensor. An example of a magnetometer is a solid-state Hall Effect sensor, which can be used to produce a voltage proportional to an applied magnetic field and to sense polarity of the magnetic field. Another example of a magnetometer is a fluxgate magnetometer.

Based on the magnetometer output, and sometimes other sensor data, like accelerometer outputs, the mobile device processor can compute a magnetic heading, where magnetic heading refers to the device orientation relative to the magnetic meridian that represents direction to the Earth magnetic pole. Other sensor data, such as gyroscope data or data from some other angular rate sensor, can be also used, when available, to filter the compass errors. After magnetic heading has been determined, the magnetic heading value can be converted into a True Heading value, relative to the Geographical Meridian, with the help of magnetic declination table.

A mobile device may integrate an electronic magnetic compass, such as a magnetometer, to assist in position location or navigation applications. For example, a mobile device may implement a "Point-and-click" application, with the user pointing the device to certain object, and the device software identifying the object using a determined or otherwise known location and time, the heading, and a map database.

A PMV (300) may comprise one or more LIDAR units. The LIDAR units may be single-channel LIDARs. The LIDAR units may be one or more scanning LIDARs. The LIDAR units may illuminate a target or detectable range with laser light. The LIDAR units may be capable of detecting backscattering. The light may comprise ultraviolet, visible, and/or near-infrared light to image the surrounding environment. The LIDAR units may be capable of detecting a wide range of materials. For instance, the LIDAR may detect metallic or non-metallic objects, precipitation, certain aerosols, clouds or molecules. In some embodiments, the LIDAR units may be operating at a high resolution. Any type of LIDAR may be used, such as Rayleigh LIDAR, Mie LIDAR, Raman LIDAR, Na/Fe/K LIDAR, etc. In some embodiments, the LIDAR units need not be of a mechanical scanning type of LIDAR. For example, the LIDAR units may include phase array LIDARs integrated on microchips. Advantages of phase array LIDARs include lower cost, lower weight, smaller form factor, and fewer mechanical components compared to existing scanning LIDAR systems. Phase array LIDARs are also more robust due to the lack of moving parts since the components are integrated onto microchips.

One or more cameras may be disposed on a PMV (300). The cameras may collectively form a vision sensing system. Multiple cameras may be provided. The cameras may be capable of capturing image data for environmental sensing. The cameras may be the same type of cameras or different types of cameras. In some embodiments, the cameras may include stereo cameras. Optionally, the cameras may include one or more monocular cameras. In some instances, combinations of stereo cameras and monocular cameras may be provided. The cameras may include black and white cameras. In some embodiments, the cameras may include color cameras. Any description herein of cameras may apply to any type of vision sensors, and may be referred to interchangeably as imaging devices of which examples are described below.

An imaging device may be a physical imaging device. An imaging device can be configured to detect electromagnetic radiation (e.g., visible, infrared, and/or ultraviolet light) and generate image data based on the detected electromagnetic radiation. An imaging device may include a charge-coupled device (CCD) sensor or a complementary metal-oxide-semiconductor (CMOS) sensor that generates electrical signals in response to wavelengths of light. The resultant electrical signals can be processed to produce image data. The image data generated by an imaging device can include one or more images, which may be static images (e.g., photographs), dynamic images (e.g., video), or suitable combinations thereof. The image data can be polychromatic (e.g., RGB, CMYK, HSV) or monochromatic (e.g., grayscale, black-and-white, sepia). The imaging device may include a lens configured to direct light onto an image sensor.

The imaging device can be a camera. A camera can be a movie or video camera that captures dynamic image data (e.g., video). A camera can be a still camera that captures static images (e.g., photographs). A camera may capture both dynamic image data and static images. A camera may switch between capturing dynamic image data and static images. Although certain cases provided herein are described in the context of cameras, it shall be understood that the present disclosure can be applied to any suitable imaging device, and any description herein relating to cameras can also be applied to any suitable imaging device, and any description herein relating to cameras can also be applied to other types of imaging devices. A camera can be used to generate 2D images of a 3D scene (e.g., an environment, one or more objects, etc.). The images generated by the camera can represent the projection of the 3D scene onto a 2D image plane. Accordingly, each point in the 2D image corresponds to a 3D spatial coordinate in the scene. The camera may comprise optical elements (e.g., lens, mirrors, filters, etc). The camera may capture color images, greyscale image, infrared images, and the like. The camera may be a thermal imaging device when it is configured to capture infrared images.

A PMV may be equipped with a proximity sensor. A proximity sensor may use one or more physical phenomena to determine the distance between an object and the sensor, such as electromagnetic phenomena or ultrasonic phenomena. A proximity sensor may include capacitive sensors, capacitive displacement sensors, Doppler effect sensors, eddy-current sensors, inductive sensors, magnetic sensors, photoelectric sensors, photocell sensors, laser rangefinders, passive thermal infrared sensors, ionizing radiation sensors, sonar sensors, ultrasonic sensors, fiberoptic sensors, or Hall effect sensors. A proximity sensor may have the ability to detect objects at various ranges. In some instances, a proximity sensor may be able to detect objects at 500 ft, 100 ft, 10 ft, 1 ft, 10 centimeters (cm), or 1 cm or less.

In some embodiments, the PMV can include one or more inertial measurement units (IMUs) that can detect acceleration and rotation of the PMV. Based on information generated from the IMUs, a computing device can determine what operation zone the PMV is travelling.

In some embodiments, the PMV can include one or more sensors to detect objects near the PMV. For example, the PMV can include proximity sensors that can detect vertical structures, such as the walls of buildings. The collected proximity sensor data can be used to determine a distance from the PMV to the buildings, which can be indicative of whether the PMV is travelling on which road.

In some embodiments, the PMV can include sensors configured to identify a magnetic field created by buildings as landmarks near specific roads. As the PMV is travelling, changes to the detected magnetic field may indicate whether the PMV is travelling on which road. For example, a sensor on the scooter may manipulate the magnetic field and create a unique signature.

Other example sensors that can be disposed on the PMV (300) may include any of location sensors (e.g., global positioning system (GPS) sensors, mobile device transmitters enabling location triangulation), vision sensors (e.g., imaging devices capable of detecting visible, infrared, or ultraviolet light, such as cameras), proximity sensors (e.g., ultrasonic sensors, lidar, time-of-movement cameras), inertial sensors (e.g., accelerometers, gyroscopes, inertial measurement units (IMUs)), altitude sensors, pressure sensors (e.g., barometers), audio sensors (e.g., microphones) or field sensors (e.g., magnetometers, electromagnetic sensors).

The sensors may have various detectable ranges. A detectable range of the sensor may include a region relative to the sensor where the sensor may collect data. The detectable range may include a distance range and/or a direction. For example, detectable range may include a maximum distance and/or minimum distance that can be read by the sensor. The minimum distance may be zero. The maximum distance may or may not be affected by environmental conditions (e.g., temperature, particulates in the air, precipitation, air pressure, noise, etc.). Direction may include an angle range. For instance, a sensor may have an angular range field of view. Different sensors may have different detectable ranges or the same detectable range.

In some embodiments, the PMV (300) can include one or more positioning sensors (e.g., global positioning system (GPS) sensors) either alone in combination with an inertial measurement unit (IMU). Based on the positioning sensors and/or the IMU sensors, the geographic position of the PMV may be determined. The accuracy geographic position of the PMV may be determined by the quality and accuracy of the GPS signal. In some cases, a high positioning accuracy sensor, such as real-time kinematic (RTK)-GPS, can be used having extremely refined positioning (e.g., centimeter-level positioning).

Methods as described herein can be implemented by way of machine (e.g., computer processor) executable code stored on an electronic storage location of the computer system. The machine executable or machine readable code can be provided in the form of software. During use, the code can be executed by a processor. The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution. Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASIC s), programmable logic devices (PLDs), field-programmable gate arrays (FPGAs), etc.

Although the description has been described with respect to particular embodiments thereof, these particular embodiments are merely illustrative, and not restrictive. Concepts illustrated in the examples may be applied to other examples and implementations.

While preferred embodiments of the present disclosure have been shown and described herein, it will be obvious to those skilled in the art that such embodiments are provided by way of example only. It is not intended that the disclosure be limited by the specific examples provided within the specification. While the disclosure has been described with reference to the aforementioned specification, the descriptions and illustrations of the embodiments herein are not meant to be construed in a limiting sense. Numerous variations, changes, and substitutions will now occur to those skilled in the art without departing from the disclosure. Furthermore, it shall be understood that all aspects of the disclosure are not limited to the specific depictions, configurations or relative proportions set forth herein which depend upon a variety of conditions and variables. It should be understood that various alternatives to the embodiments of the disclosure described herein may be employed in practicing the disclosure. It is therefore contemplated that the disclosure shall also cover any such alternatives, modifications, variations or equivalents. It is intended that the following claims define the scope of the disclosure and that methods and structures within the scope of these claims and their equivalents be covered thereby.

We claim:

1. A vehicle comprising:
 a memory storing zone map data representing one or more operation zones and one or more operation rules;
 a sensor of the vehicle fetching vehicle location data from one or more location beacons; and
 a controller, in communication with the sensor, analyzing the vehicle location data and comparing a present location against locations in the stored zone map data stored in the memory,
 wherein when the controller is configured to:
 determine whether the vehicle is entering one of the one or more operation zones, the controller adjusts an operating parameter of the vehicle based upon the one or more operation rules associated with the operation zone that the vehicle is entering; and
 send a zone event message comprising information about the one or more operation zones that the vehicle has entered, including sending at least one of the one or more operation rules,
 wherein a server, in response to receiving the zone event message, sends a confirmation of the one or more operation rules associated with the operation zone that the vehicle is entering, the confirmation including an override message and one or more corrected operational rules, wherein the vehicle overrides the stored zone map data with updated zone map data, and
 once the confirmation is received at the vehicle, the controller of the vehicle is further configured to adjust the operating parameter of the vehicle based upon the one or more corrected operation rules.

2. The vehicle of claim 1, wherein the sensor fetches the vehicle location data at a predetermined periodic interval.

3. The vehicle of claim 2, wherein the predetermined periodic interval is configurable.

4. The vehicle of claim 1, wherein the one or more operation zones are defined by sets of polygon coordinates within the stored zone map data.

5. The vehicle of claim 1, wherein operation rules for one or more operation zones are saved in the memory of the vehicle.

6. The vehicle of claim 5, wherein when the controller determines that the vehicle is entering one of the one or more operation zones, the controller is further configured to:
 send a zone event message to a server including an identification of an operation zone being entered and the present location received by the sensor.

7. The vehicle of claim 6, wherein the server determines the one or more operation rules associated with the operation zone that the vehicle is entering.

8. The vehicle of claim 6, wherein the server determines, based on the identification of the operation zone being entered and a present location received by the sensor, whether the vehicle determined operation zone is accurate by comparing the polygon coordinates for the determined operation zone within the stored zone map data to the polygon coordinates for the determined operation zone stored on the server, and when it is not, the server sends override information to the vehicle correcting the stored zone map data.

9. The vehicle of claim 6, wherein the server periodically updates the stored zone map data and operation rules of the vehicle.

10. A method of vehicle control, comprising:
 fetching, via a sensor on the vehicle, location data of the vehicle from one or more location beacons;
 analyzing, via a controller on the vehicle, zone map data stored in a memory on the vehicle;
 determining, via the controller, when a location of the vehicle is entering or within one or more operation zones defined in the zone map data;
 wherein when the controller is configured to:
 determine that the vehicle is entering one of the one or more operation zones, the controller adjusts an operating parameter of the vehicle based upon one or more operation rules associated with the operation zone that the vehicle is entering; and
 send a zone event message, to a server, comprising information about the one or more operation zones that the vehicle has entered, including at least one operation rule,
 wherein if a server, in response to receiving the zone event message, determines that the information about the one or more operation zones matches a stored value the server, the server sends a confirmation of the one or more operation rules associated with the operation zone that the vehicle is entering, if the server, in response to receiving the zone event message, determines that the information about the one or more operation zones does not match a stored value, the server sends a confirmation including an override message and one or more corrected operational rules, wherein the vehicle overrides the stored zone map data with updated zone map data, and
 once the confirmation is received at the vehicle, the controller of the vehicle is further configured to adjust the operating parameter of the vehicle based upon the one or more corrected operation rules.

11. The method of claim 10, wherein the sensor fetches the vehicle location data at a predetermined periodic interval.

12. The method of claim 11, wherein the predetermined periodic interval is configurable.

13. The method of claim 10, wherein the one or more operation zones are defined by sets of polygon coordinates within the stored zone map data.

14. The method of claim 10, wherein operation rules for one or more operation zones are saved in the memory of the vehicle.

15. The method of claim 14, wherein when the controller determines that the vehicle is entering one of the one or more operation zones, the method further comprises:
 sending a zone event message to a server including an identification of an operation zone being entered and the present location received by the sensor.

16. The method of claim 15, further comprising:
 determining, by the server, the one or more operation rules associated with the operation zone that the vehicle is entering.

17. The method of claim 15, further comprising:
 determining, by the server, based on the identification of the operation zone being entered and a present location received by the sensor, whether the vehicle determined operation zone is accurate by comparing the polygon coordinates for the determined operation zone within the stored zone map data to the polygon coordinates for the determined operation zone stored on the server, and when it is not,
 sending, by the server, override information to the vehicle correcting the stored zone map data.

18. The method of claim 15, wherein the server periodically updates the stored zone map data and operation rules of the vehicle.

19. The vehicle of claim 1, wherein the server determines that the zone event message contains incorrect operational rules by comparing polygon coordinates for the one or more operation zones within stored zone map data to polygon coordinates for the one or more operational zones stored on the server.

20. The method of claim 10, wherein the server determines that the zone event message contains incorrect operational rules by comparing polygon coordinates for the one or more operation zones within stored zone map data to polygon coordinates for the one or more operational zones stored on the server.

* * * * *